United States Patent
Nishimura

(12) 
(10) Patent No.: US 6,269,421 B1
(45) Date of Patent: Jul. 31, 2001

(54) RECEIVING APPARATUS AND DATA REWRITING METHOD

(75) Inventor: Takuya Nishimura, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/229,199

(22) Filed: Jan. 13, 1999

(30) Foreign Application Priority Data

Jan. 16, 1998 (JP) .................................................. 10-006781

(51) Int. Cl.[7] .................................................. G06F 12/00
(52) U.S. Cl. ........................................... 711/103; 711/112
(58) Field of Search .................................. 711/103, 112; 348/10; 455/3.2, 6.2

(56) References Cited

U.S. PATENT DOCUMENTS

| | | | |
|---|---|---|---|
| 4,356,549 | * 10/1982 | Chueh ................................. | 364/200 |
| 5,619,274 | * 4/1997 | Roop et al. .......................... | 348/461 |
| 5,715,515 | * 2/1998 | Akins, III et al. ................... | 455/4.1 |
| 5,835,864 | * 11/1998 | Diehl et al. .......................... | 455/6.2 |
| 5,880,769 | * 3/1999 | Nemirofsky et al. ................ | 348/12 |
| 5,978,012 | 11/1999 | Ozawa et al. ........................ | 348/10 |
| 6,057,874 | * 5/2000 | Michaud ............................... | 348/6 |

* cited by examiner

Primary Examiner—Matthew Kim
Assistant Examiner—Christian P. Chace
(74) Attorney, Agent, or Firm—Lerner, David, Littenberg, Krumholz & Mentlik, LLP

(57) ABSTRACT

A receiving apparatus and a data rewriting method which can rewrite data accurately. A rewriting means in the receiving apparatus receives predetermined second data transmitted from a transmitting side, obtains a predetermined first fixed value based on the received second data, compares the obtained first fixed value to a second fixed value given from an external source via a predetermined medium, and when the first and second fixed values are coincident with each other, rewrites the first data previously recorded rewritably in the recording medium with the second data. Thereby, it can be judged accurately whether the second data is correct data for rewriting the first data.

12 Claims, 6 Drawing Sheets

RECEIVING APPARATUS AND DATA REWRITING METHOD

BACKGROUND OF THE INVENTION

1. Field of the Invention

The present invention relates to a receiving apparatus and a data rewriting method, and more particularly, is preferably applicable to a digital satellite broadcasting system.

2. Description of the Related Art

A method called Moving Picture Experts Group Phase 2 (MPEG2) has been proposed for coding analog video audio signals and digital video audio data in a television broadcasting system, a High Definition Television (HDTV), an Audio Visual (AV) device, and so on.

The MPEG2 method is provided to encode and then multiplex a predetermined analog signal and digital data. The MPEG2 method recently was used as a method for coding video audio data in accordance with a plurality of programs. As a result, a digital satellite broadcasting system for broadcasting respective programs via a broadcasting satellite toward specified viewers who are allowed to view (who contract as viewers) has been realized to some extent.

The digital satellite broadcasting system has a higher coding efficiency compared to a conventional television broadcasting system for coding video audio signals by the MPEG2 method, so as to realize multichannel broadcasting and to reduce the cost per channel. Thereby, various data for data broadcasting (hereinafter, referred to as service data) can be broadcasted simultaneously in addition to the programs for plural channels, so that the digital satellite broadcasting system will be used increasingly for more purposes.

Such a digital satellite broadcasting system has a plurality of broadcasting forms depending upon the company which manages the system (hereinafter, referred to as a management company). The viewer who is allowed to view programs by contracting with these management companies is required to buy an exclusive digital broadcasting receiver in accordance with the broadcasting form of the corresponding digital satellite broadcasting system.

Accordingly, in a case in which the viewer terminates a contract with a management company and changes a management company to newly contract with another management company (hereinafter, referred to as management company change), the viewer must buy a new digital broadcasting receiver for the new contract, despite that the viewer already owns a digital broadcasting receiver, thereby causing a burden for the viewer.

There are modifiable types of digital broadcasting receivers in addition to the types corresponding to the broadcasting form of the digital satellite broadcasting system. Each of the modifiable types of digital broadcasting receivers stores program data in accordance with the type and the broadcasting form of the corresponding digital satellite broadcasting system in a flash Read Only Memory (ROM) provided inside, and receives programs broadcasted by the corresponding digital satellite broadcasting system based on the program data.

In a case where a viewer changes a management company, the viewer rewrites the program data recorded in the internal flash ROM in his/her own digital broadcasting receiver with the program data in accordance with the broadcasting form of the digital satellite broadcasting system managed by the management company newly contracted and in accordance with the type, so as to use the same digital broadcasting receiver after contract with a new management company.

To actually rewrite the program data of the digital broadcasting receiver, as shown in FIG. 1, when a viewer demands a management company change of a management company which will be newly contracted, in a transmitting apparatus 2 of a digital satellite broadcasting system 1 which is managed by the management company, a data supplying part 3 supplies new program data D1 which is necessary to rewrite (hereinafter, referred to as download data) in accordance with the type of digital broadcasting receiver 4 which is presently owned by the viewer and in accordance with the broadcasting form of the digital satellite broadcasting system 1 to a data transmitting part 6 through a data outputting part 5 during a predetermined fixed period of time repeatedly. At the same time, the data transmitting part 6 modulates the download data D1 by a predetermined method to generate transmission data D2, which is broadcasted toward a broadcasting satellite 8 via an antenna 7.

Then, the transmission data D2 is received by the digital broadcasting receiver 4 of a receiving apparatus 9 which is owned by the viewer via an antenna 10. The digital broadcasting receiver 4 demodulates the transmission data D2 by a predetermined method, and overwrites the flash ROM (not shown) with the obtained download data D1 to rewrite the program data which has been recorded in the flash ROM with the download data D1. Such a method is known.

If the viewer rewrites the program data in this way at the time of the contract with a new management company, the viewer can receive programs from the digital satellite broadcasting system 1 managed by this management company, and can view the received programs through a monitor 11.

However, this method has a problem. While the transmission data D2 is being transmitted from the transmitting apparatus 2, if false transmission data (hereinafter, referred to as false transmission data) containing false download data which has altered contents and contains a virus (hereinafter, referred to as false download data) is transmitted from another transmitting apparatus toward the broadcasting satellite 8 intentionally, the digital broadcasting receiver 4 may receive the false transmission data instead of the transmission data D2 transmitted normally and the false download data obtained based on the false transmission data may overwrite the flash ROM. In this case, the digital broadcasting receiver 4 operates incorrectly based on the false download data.

SUMMARY OF THE INVENTION

In view of the foregoing, an object of this invention is to provide a receiving apparatus and a data rewriting method which can rewrite data accurately.

The foregoing object and other objects of the invention have been achieved by the provision of a recording medium in which predetermined first data has been previously recorded rewritably; and rewriting means for receiving predetermined second data transmitted from a transmitting side to calculate a predetermined first fixed value of the second data based on the received second data, for comparing the calculated first fixed value and a second fixed value given from an external source through a predetermined medium, and when the first fixed value is coincident with the second fixed value based on the compared result, for rewriting the first data which has been recorded in the recording medium with the second data.

As a result, it can be determined accurately whether the second data is correct data for rewriting the first data.

Further, according to this invention, predetermined second data transmitted from a transmitting side is received; a predetermined first fixed value of the second data is calculated based on the received second data; the calculated first fixed value is compared to a second fixed value given from an external source through a predetermined medium; and the first data which has been recorded in the recording medium is rewritten with the second data, when the first fixed value is coincident with the second fixed value based on the compared result.

As a result, it can be determined accurately whether the second data is correct data for rewriting the first data.

The nature, principle and utility of the invention will become more apparent from the following detailed description when read in conjunction with the accompanying drawings in which like parts are designated by like reference numerals or characters.

DETAILED DESCRIPTION OF THE PREFERRED EMBODIMENTS

Preferred embodiments of the present invention will be described with reference to the accompanying drawings:

(1) Principles

Figure 1:
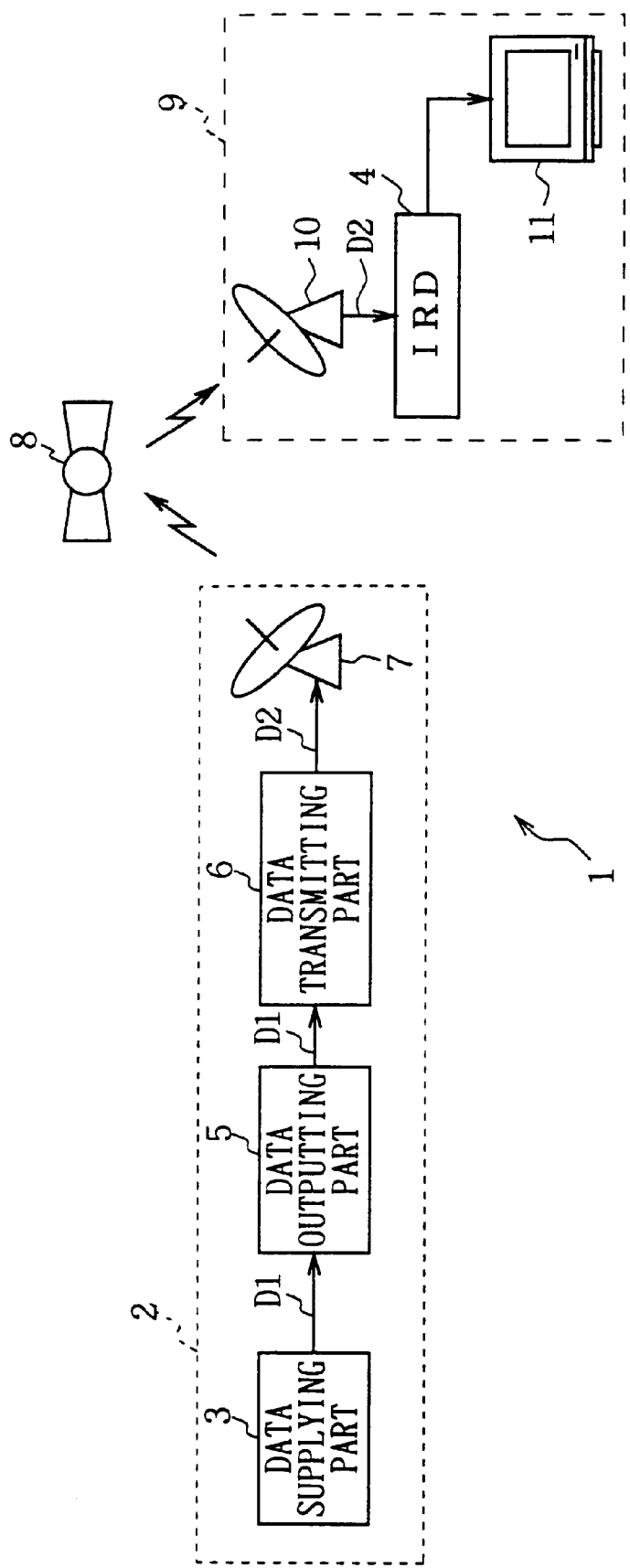
FIG. 1 is a block diagram explaining the rewriting of program data in a digital broadcasting receiver in the prior art.
Figure 2:
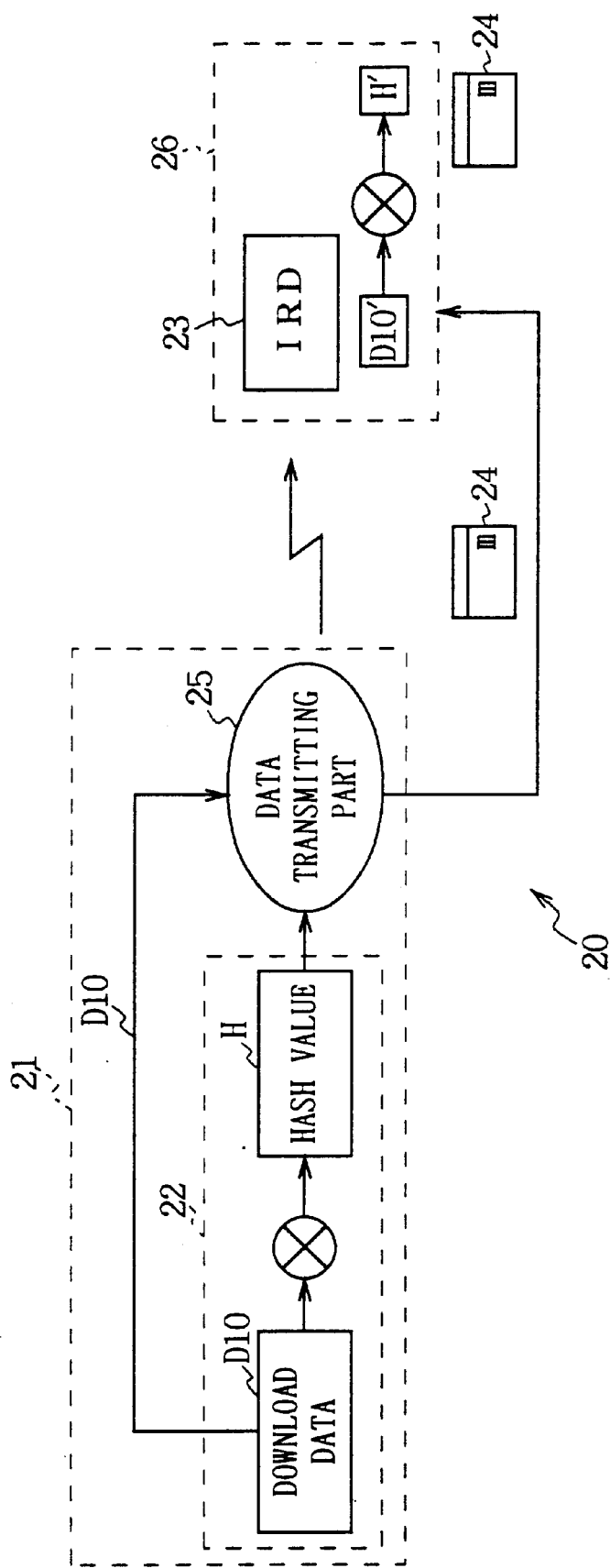
FIG. 2 is a schematic diagram showing the principles of a digital satellite broadcasting system according to the present invention.

As shown in FIG. 2, in a digital satellite broadcasting system 20 for transmitting download data D10 via a broadcasting satellite, when a viewer demands a management company change of a selected management company which manages the digital satellite broadcasting system 20, a data generating part 22 of a transmitting apparatus 21 calculates from the download data D10, determined in accordance with the type of a digital broadcasting receiver 23 which is owned by the viewer and in accordance with the broadcasting form of the digital satellite broadcasting system 20, by using the Hash function (Secure Hash Algorithm designed by the United States NIST) to obtain a Hash value H (hereinafter, referred to as standard Hash value).

In this connection, the standard Hash value H is such a value that the contents of download data D10 having a data size of 2 to 3 Mbits are summed up into 64 to 128 bits, and is such a value that the download data D10 is not easily obtained from the standard Hash value H. Moreover, even if the false download data is calculated by using the Hash function, it is difficult to obtain the same value as the standard Hash value H, thereby it becomes a particular value of the download data D10 in this case.

In the transmitting apparatus 21, the standard Hash value H is recorded in a memory provided inside an Integrated Circuit (IC) card 24. The IC card 24 is given to the viewer, and the download data D10 is transmitted through a data transmitting part 25 under this condition.

A receiving apparatus 26 calculates from the received download data D10' by using the Hash function to obtain the Hash value H' (hereinafter, referred to as Hash value for comparison), and compares the Hash value for comparison H' to the standard Hash value H read from the memory of the IC card 24, so that it can be determined accurately based on the compared result whether the received download data D10' is the correct data actually transmitted from the transmitting, apparatus 21.

In this way, in the digital broadcasting receiver 23, the download data D10', which is determined as correct data based on the compared result between the standard Hash value H and the Hash value for comparison H', overwrites the internal memory, so that the program data recorded in the memory is rewritten to the correct download data D10.

Figure 3:
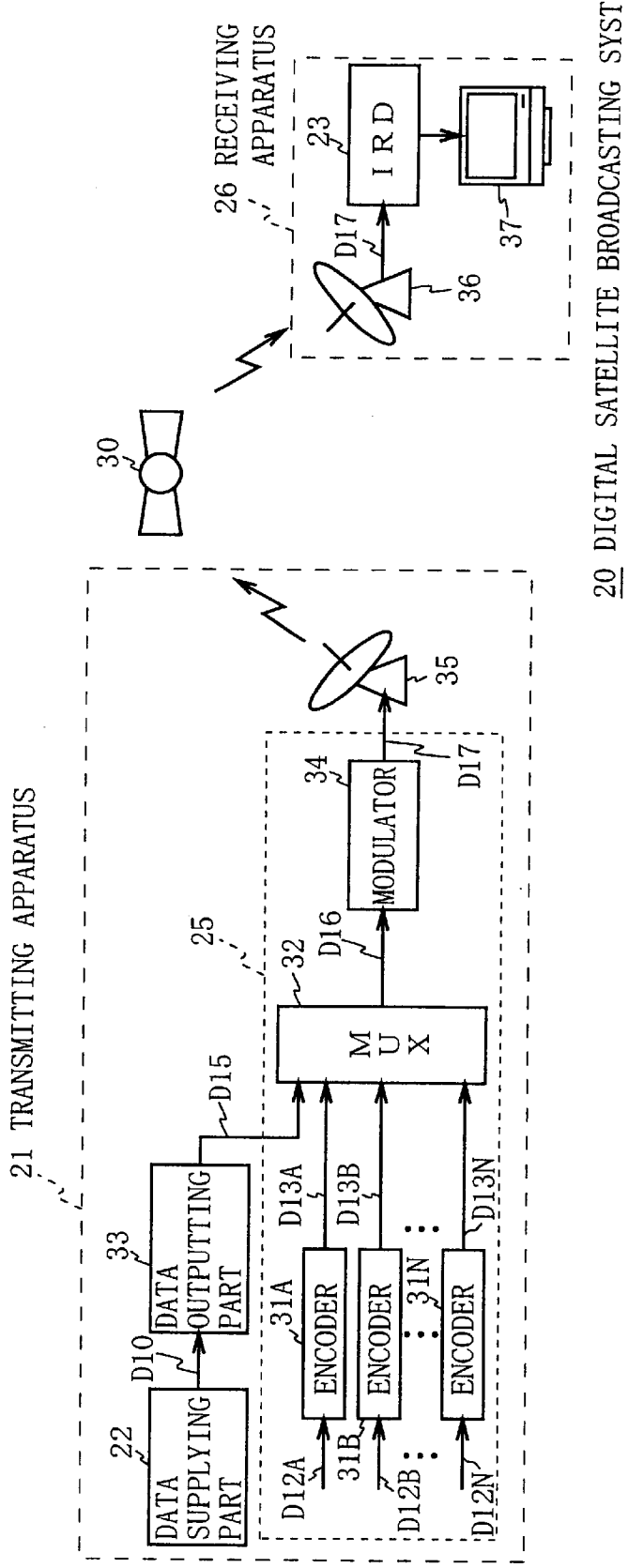
FIG. 3 is a block diagram showing one embodiment of the construction of a digital satellite broadcasting system according to this invention.

(2) The Construction of a Digital Satellite Broadcasting System According to this Embodiment In FIG. 3 in which the portions corresponding to those of FIG. 2 are designated with the same symbols, 20 designates a digital satellite broadcasting system according to this invention, and the receiving apparatus 26 receives multi-channel programs transmitted from the transmitting apparatus 21 via a broadcasting satellite 30.

In this case, in the data transmitting part 25 of the transmitting apparatus 21, video data, audio data, or service data D12A to D12N in accordance with the multichannel programs (hereinafter, referred to as program data all together) are supplied to corresponding encoders 31A to 31N to respectively encode the corresponding program data D12A to D12N by the MPEG2 method. The obtained encoded data are successively packetized for each predetermined unit to generate packet data D13A to D13N (hereinafter, referred to as program packet data). The program packet data D13A to D13N are successively supplied to a multiplexer 32.

At this time, the data supplying part 22 supplies the download data D10 to a data outputting part 33. The data outputting part 33 encodes the download data D10 by the MPEG2 method, and thereafter successively supplies each packet data D15 obtained by packetizing for each predetermined unit (hereinafter, referred to as download packet data) to the multiplexer 32 during a predetermined fixed period of time repeatedly.

The multiplexer 32 successively time division multiplexes each of program packet data D13A to D13N and each download packet data D15, so as to convert them into one transport stream D16, which is modulated by a predetermined method by a modulator 34. The obtained transmission data D17 is then transmitted toward the broadcasting satellite 30 via an antenna 35.

The transmission data D17 transmitted toward the broadcasting satellite 30 is received by the digital broadcasting receiver 23 of the receiving apparatus 26 via an antenna 36. When the viewer instructs to change the program data recorded in the internal flash ROM (not shown), the digital broadcasting receiver 23 demodulates the transmission data D17 by a predetermined method, and picks up the download packet data D15 from the obtained transport stream D16 and decodes the picked up download packet data D15 to obtain the download data D10.

The digital broadcasting receiver 23 determines based on the Hash value recorded in the memory of the IC card (not shown) which has been previously given from the management company whether the download data D10 is correct data transmitted from the transmitting apparatus 21 of the digital satellite broadcasting system 20. Only if the download data D10 is determined as correct data, it overwrites the internal flush ROM. In this way, the program data recorded in the flush ROM is rewritten into the download data D10.

The digital broadcasting receiver 23 then receives the programs broadcasted in the digital satellite broadcasting system 20 based on the download data D10 newly recorded in the internal flash ROM, and the programs can be viewed by the viewer through a monitor 37.

Figure 4:
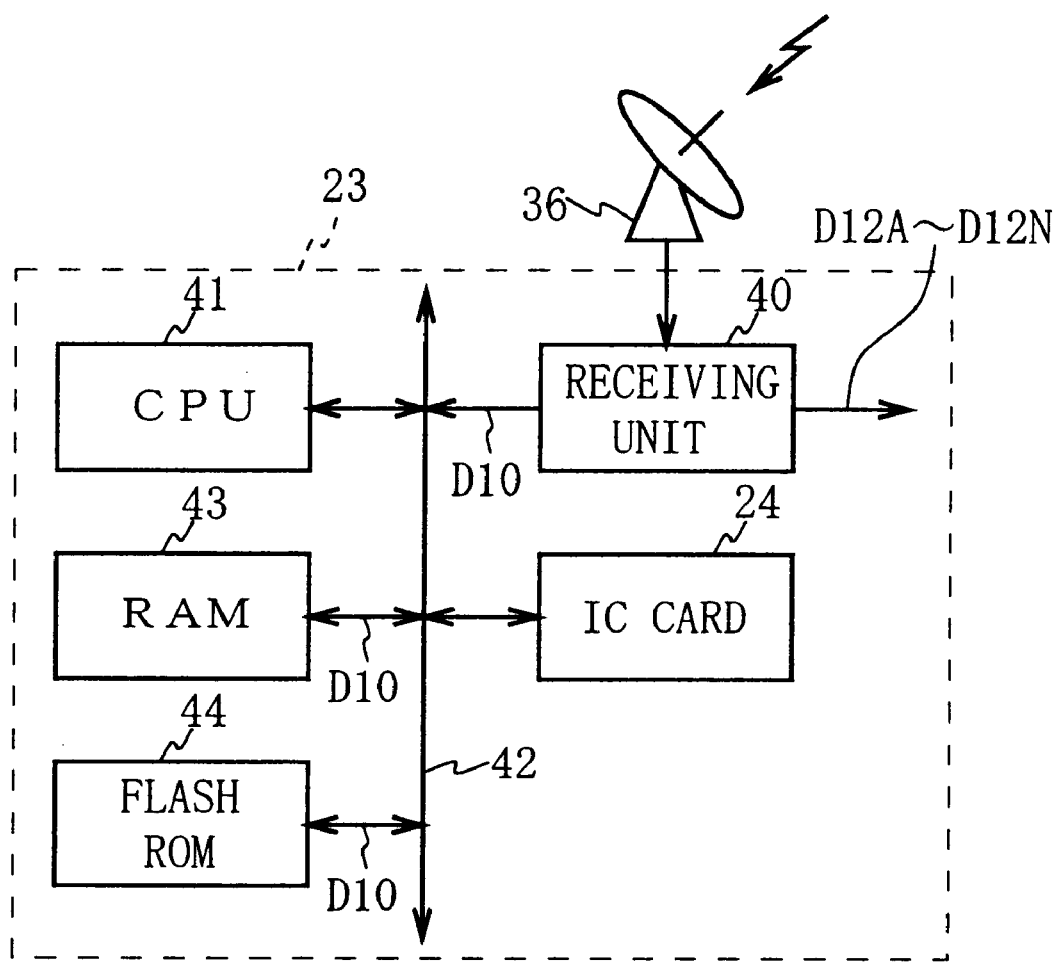
FIG. 4 is a block diagram showing the construction of a digital broadcasting receiver.

Practically, the digital broadcasting receiver 23, as shown in FIG. 4, receives the transmitted transmission data D17 by the receiving unit 40 via the antenna 36, in the state that the IC card 24 given from the management company is loaded.

The receiving unit 40 demodulates the transmission data D17 by a predetermined method under the control of a Central Processing Unit (CPU) 41, to pick up each download packet data D15 from the obtained transport stream D16, and decodes each picked up download packet data D15 to obtain the download data D10, which is supplied to a Random Access Memory (RAM) 43 through a CPU bus 42 to store it.

At this time, the CPU 41 reads out the download data D10 from the RAM 43 through the CPU bus 42, and reads out the Hash function which has been previously recorded in the flash ROM 44 through the CPU bus 42. The read out download data D10 is operated by using the Hash function to obtain the Hash value for comparison.

The CPU 41 then reads out the standard Hash value which has been recorded in the memory inside the IC card 24 through the CPU bus 42, and compares the read out standard Hash value and the Hash value for comparison obtained based on the download data D10. If these are not coincident with each other based on the compared result, the download data D10 is determined to be false download data.

The CPU 41, while leaving the program data recorded in the flash ROM 44 as it is, receives the transmission data D17 again to calculate the Hash value for comparison, and then compares the Hash value for comparison and the standard Hash value. Until the standard Hash value is coincident with the Hash value for comparison, the CPU 41 successively repeats the process from the reception of the transmission data D17 to the comparison between the standard Hash value and the Hash value for comparison.

Also, the CPU 41 judges that the download data D10 is correct data when the standard Hash value is coincident with the Hash value for comparison. The download data D10 stored in the RAM 43 is supplied from the RAM to the flash ROM 44 through the CPU bus 42 to overwrite the program data recorded in the flash ROM with the download data D10.

After rewriting the program data recorded in the flash ROM with the download data D10, the CPU 41 controls the digital broadcasting receiver 23 based on the download data D10.

The receiving unit 40, under the control of the CPU 41, demodulates the transmission data D17 received via the antenna 36 by a predetermined method to successively pick up each of program packet data D13A to D13N from the obtained transport stream D16, and decodes each of the picked up program packet data D13A to D13N to obtain each of program data D12A to D12N. These program data D12A to D12N are supplied to a monitor (not shown).

The digital broadcasting receiver 23 thereby can rewrite the program data recorded in the flash ROM accurately.

(3) Operation and Effects of this Embodiment

Figure 5:
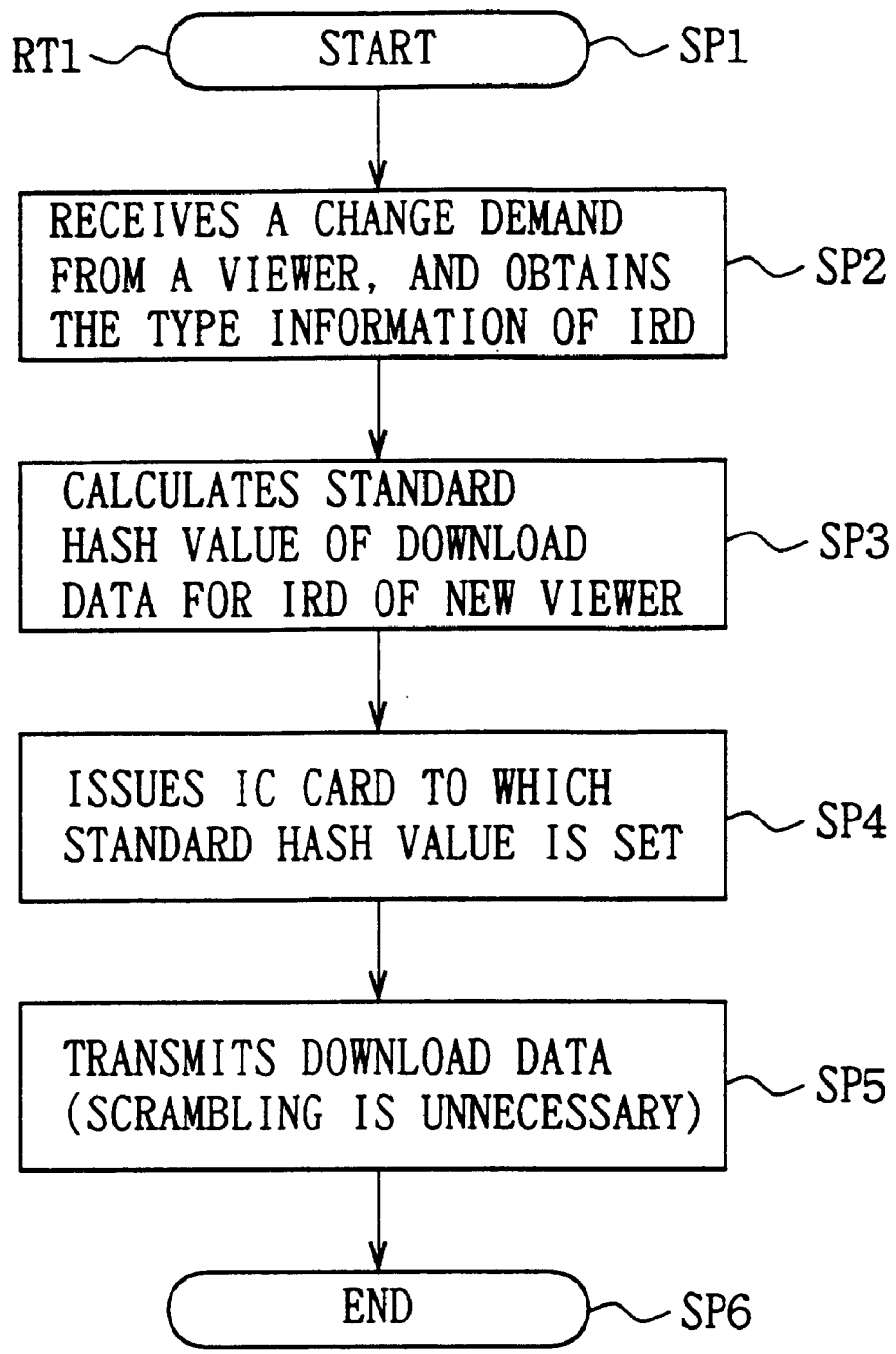
FIG. 5 is a flowchart showing the procedure of transmitting side when a viewer changes a management company.

In the above configuration, in the digital satellite broadcasting system 20, in the case of changing a management company by a viewer, when the management company receives a demand of management company change from the viewer, the procedure of transmitting side RT1 shown in FIG. 5 is started at a transmitting side (step SP1). Then the management company obtains information indicating the viewer's type of digital broadcasting receiver 23 (hereinafter, referred to as type information) from the viewer (step SP2).

Next, at the transmitting side, the standard Hash value is calculated based on the download data D10 in accordance with the type of the viewer's own digital broadcasting receiver 23 and in accordance with the broadcasting form of the digital satellite broadcasting system (step SP3), and the IC card 24 which records the standard Hash value in its internal memory is issued to the viewer (step SP4).

At the transmitting side, the transmission data D17 based on the download data D10 in accordance with the type of the viewer's own digital broadcasting receiver 23 is transmitted toward the broadcasting satellite 30 through the transmitting apparatus 21 (step SP5), and the procedure of transmitting side RT1 is terminated (step SP6).

Figure 6:
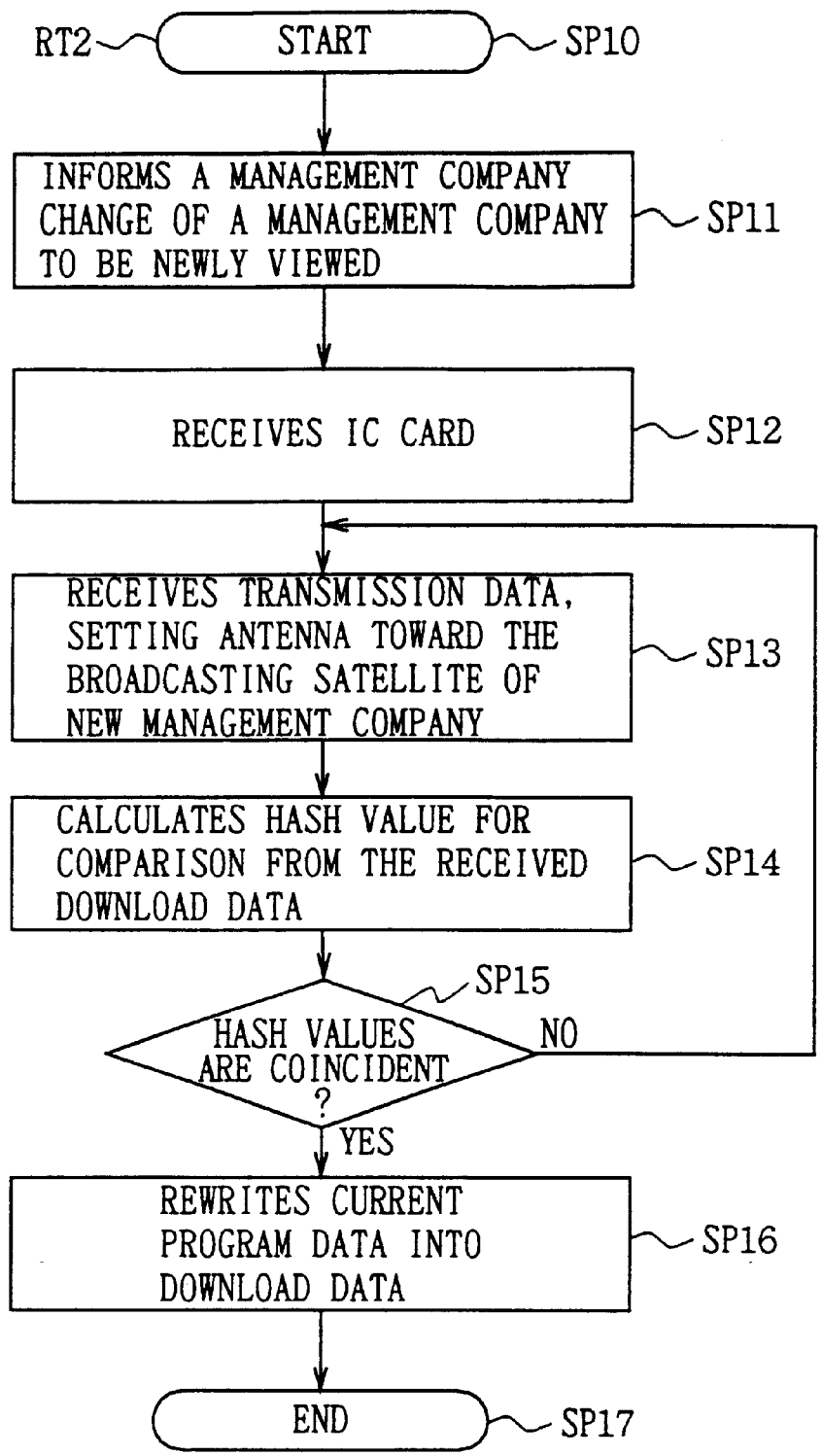
FIG. 6 is a flowchart showing the procedure of receiving side when a viewer changes a management company.

On the other hand, at a receiving side, when a viewer demands a management company change, the procedure of receiving side RT2 shown in FIG. 6 is started (step SP10). Then, the viewer informs of a new contract with a specific management company (step SP11).

Next, at the receiving side, the viewer receives the IC card 24 which is issued by the management company (step SP12). The viewer adjusts the direction of the antenna 36 of the receiving apparatus 26 toward the broadcasting satellite 30 used in the digital satellite broadcasting system 20 which is managed by the management company to receive the transmission data D17 by the digital broadcasting receiver 23 in this state (step SP13).

At the receiving side, the Hash value for comparison is calculated based on the download data D10 obtained from the reception data D17 by the digital broadcasting receiver 23 (step SP14), and the Hash value for comparison is compared to the standard Hash value read out from the memory in the IC card 24 (step SP15).

At this time, at the receiving side, if the Hash value for comparison is not coincident with the standard Hash value, the antenna 36 is readjusted to the broadcasting satellite 30 to receive the transmission data D17 again. The Hash value for comparison is calculated based on the download data D10 obtained based on the reception data D17. The procedure (step SP15-SP13-SP14-SP15) is repeated until the Hash value for comparison is coincident with the standard Hash value.

At the receiving side, if the Hash value for comparison is coincident with the standard Hash value, the program data which has been recorded in the flash ROM of the digital broadcasting receiver 23 is replaced with the download data D10 (step SP16), and the procedure of the receiving side is terminated (step SP17).

Thereby, in the digital satellite broadcasting system 20, the digital broadcasting receiver 23 compares the standard Hash value obtained from the download data D10, prior to this data's transmission from the transmitting apparatus 21, and the Hash value for comparison obtained from the download data D10 obtained by reception, so that it can be judged accurately based on the compared result whether the download data D10 is the correct download data D10 transmitted from the transmitting apparatus 21.

According to the above configuration, in the digital broadcasting receiver 23, the Hash value for comparison is calculated based on the download data D10 which is obtained by reception, and the Hash value for comparison is compared to the standard Hash value which was previously obtained from the transmitting apparatus 21. When the standard Hash value is coincident with the Hash value for comparison, the program data recorded in the flash ROM 44 is replaced with the download data D10, so that it can be judged accurately whether the download data D10 obtained by reception in the digital broadcasting receiver 23 is the correct data. Thereby, a receiving apparatus which can accurately replace the program data with the download data D10 is realized.

(4) Other Embodiments

The embodiment described above deals with the case where the invention is applied to the digital satellite broadcasting system 20 for receiving by the receiving apparatus 26 the download data D10 transmitted from the transmitting apparatus 21 when the viewer changes a management company. However, this invention is not limited to this situation. Also the invention can be applied to other receiving apparatuses. For example, the data rewriting method of the invention can be applied to updating the program data of the same management company. The digital satellite broadcasting system can transmit download data having an improved efficiency compared to the program data recorded in the flash ROM of the digital broadcasting receiver.

Further, the embodiment described above deals with the case where the standard Hash value is recorded in the memory of the IC card 24 to be given to the viewer (digital broadcasting receiver). However, the invention is not limited to this scheme. The standard Hash value can be transmitted to the digital broadcasting receiver 23 through other various media such as a network, a transmission circuit like a telephone circuit and a satellite communication circuit. Also, in place of IC card 24, a recording medium like an optical disc or a magnetic tape can be employed.

Further, the embodiment described above deals with the case where the Hash value is obtained based on the Hash function and is used as a fixed value for judging whether the data received by the receiving apparatus 26 is correct data. However, the invention is not limited to this method. Other fixed values can be used if they are unique to the data, like a fixed value obtained from the data based on various other algorithms.

Further, the embodiment described above deals with the case where a flash ROM is used as the recording medium for recording rewritably the predetermined first data (program data). However, this invention is not limited to such a memory device. Other recording media can be used.

Further, the embodiment described above deals with the case where the CPU 41 is used as a rewriting means which receives the predetermined second data (download data D10) transmitted from the transmitting side to obtain a predetermined first fixed value (Hash value for comparison) of the second data based on the received second data, compares the obtained first fixed value to a second fixed value (standard Hash value) given from an external source via a predetermined medium, and if the first and second fixed values are coincident with each other based on the compared result, rewrites the first data recorded in the recording medium with the second data. However, this invention is not limited to this, but also other various rewriting methods can be used if such methods can receive predetermined second data transmitted from the transmitting side to obtain a predetermined first fixed value of the second data based on the received second data, compare the obtained first fixed value to a second fixed value given from an external source via a predetermined medium, and if the first and second fixed values are coincident with each other, rewrite the first data recorded in the recording medium with the second data.

As described above, the present invention provides a recording medium in which predetermined first data has been previously recorded rewritably; and rewriting means for receiving predetermined second data transmitted from the transmitting side to obtain a predetermined first fixed value of the second data based on the received second data, for comparing the obtained first fixed value to a second fixed value given from an external source via a predetermined medium, and if the first and second fixed values are coincident with each other, for rewriting the first data recorded in the recording medium with the second data. Thereby, it can be judged accurately whether the second data is correct data for rewriting the first data. A receiving apparatus which can rewrite the data accurately, therefore, is realized.

Further, predetermined second data transmitted from the transmitting side is received to obtain a predetermined first fixed value of the second data based on the received second data, and the obtained first fixed value is compared to the second fixed value given from an external source via a predetermined medium. If the first and second fixed values are coincident with each other, the first data recorded in the recording medium is rewritten with the second data. Thereby, it can be accurately judged whether the second data is correct data for rewriting the first data, so that a data rewriting method which can rewrite the data accurately is realized.

While the invention has been described in connection with the preferred embodiments, it will be obvious to those skilled in the art that various changes and modifications may be claimed, therefore, to cover in the appended claims all such changes and modifications as fall within the true spirit and scope of the invention.

What is claimed is:

1. A broadcast signal receiving apparatus, comprising:
   a writable memory for storing first program data;
   a receiver for receiving a broadcast signal, said broadcast sign al including second program data;
   a controller connected to said writable memory for reading said first program data from said writable memory and controlling operation of said receiving apparatus in accordance with said first program data, said controller further calculating a first unique value based upon said second program data received by said receiver, comparing said calculated first unique value to a second unique value provided from an external source and, if said first unique value is coincident with said second unique value, replacing in said writable memory said first program data with said second program data.

2. A receiving apparatus as in claim 1, wherein said controller calculates said first unique value using a hashing function.

3. A receiving apparatus as in claim 1, wherein said external source is a removable memory card.

4. A receiving apparatus as in claim 3, further comprising means external to said receiving apparatus for calculating said second unique value based upon said second program data and storing said second unique value in said removable memory card before broadcasting said second program data.

5. A receiving apparatus as in claim 1, wherein said writable memory is a flash memory.

6. A receiving apparatus as in claim 2, further comprising a random access memory for temporarily storing said second program data received by said receiver, and wherein said writable memory further stores said hashing function, said controller reads said hashing function from said writable memory and said second program data from said random access memory, calculates said first unique value using said hashing function and said second program data read from, respectively, said writable memory and said random access memory, and replaces said first program data in said writable memory with said second program data in said random access memory if said first unique value is coincident with said second unique value.

7. A method for replacing a control program of a broadcast signal receiving apparatus, comprising:

storing in a writable memory first program data;

reading said first program data from said writable memory;

controlling operation of said receiving apparatus in accordance with said first program data read from said writable memory;

receiving a broadcast signal, said broadcast signal including second program data;

calculating a first unique value based upon said second program data received from said broadcast signal;

comparing said calculated first unique value to a second unique value provided from an external service; and replacing in said writable memory said first program data with said second program data if said first unique value is coincident with said second unique value.

8. A method as in claim 7, wherein said calculating of said first unique value is based upon a hashing function.

9. A method as in claim 7, wherein said external source is a removable memory card.

10. A method as in claim 9, further comprising calculating said second unique value based upon said second program data and storing said second unique value in said removable memory card before broadcasting said second program data.

11. A method as in claim 7, wherein said writable memory is a flash memory.

12. A method as in claim 8, further comprising temporarily storing said second program data received from said broadcast signal in a random access memory, storing said hashing function in said writable memory, reading said hashing function from said writable memory, reading said second program data from said random access memory, calculating said first unique value using said hashing function and said second program data read from, respectively, said writable memory and said random access memory, and replacing said first program data in said writable memory with said second program data in said random access memory if said first unique value is coincident with said second unique value.

\* \* \* \* \*

UNITED STATES PATENT AND TRADEMARK OFFICE
CERTIFICATE OF CORRECTION

| | |
|---|---|
| PATENT NO. | : 6,269,421 B1 |
| DATED | : July 31, 2001 |
| INVENTOR(S) | : Takuya Nishimura |

Page 1 of 1

It is certified that error appears in the above-identified patent and that said Letters Patent is hereby corrected as shown below:

<u>Column 8,</u>
Line 44, "sig nal" should read -- signal --.

Signed and Sealed this

Twelfth Day of March, 2002

Attest:

JAMES E. ROGAN
*Director of the United States Patent and Trademark Office*

*Attesting Officer*